US012033569B1

(12) United States Patent
Min et al.

(10) Patent No.: US 12,033,569 B1
(45) Date of Patent: Jul. 9, 2024

(54) DISPLAY DEVICE

(71) Applicant: SAMSUNG DISPLAY CO., LTD., Yongin-si (KR)

(72) Inventors: Jung Ki Min, Yongin-si (KR); Wook Lee, Yongin-si (KR); Sang Jae Yeo, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/205,394

(22) Filed: Jun. 2, 2023

(51) Int. Cl.
*G09G 3/32* (2016.01)

(52) U.S. Cl.
CPC ....... *G09G 3/32* (2013.01); *G09G 2310/0267* (2013.01); *G09G 2310/0275* (2013.01)

(58) Field of Classification Search
None
See application file for complete search history.

(56) References Cited

U.S. PATENT DOCUMENTS

| | | | | |
|---|---|---|---|---|
| 10,347,692 B2 | 7/2019 | Lee et al. | | |
| 2002/0036646 A1 | 3/2002 | Tobiya | G09G 3/3611 | 345/600 |
| 2004/0140972 A1 | 7/2004 | Hirota | G09G 3/3225 | 345/204 |
| 2010/0188320 A1* | 7/2010 | Min | G09G 3/3291 | 345/80 |
| 2010/0328269 A1 | 12/2010 | Kurokawa | G06F 3/0416 | 345/175 |
| 2014/0028627 A1* | 1/2014 | Nakagawa | G06F 3/0445 | 345/173 |
| 2017/0318246 A1 | 11/2017 | Shim et al. | | |
| 2018/0151124 A1 | 5/2018 | An | G09G 3/3266 | |
| 2018/0204889 A1 | 7/2018 | Yu et al. | | |
| 2019/0019789 A1 | 1/2019 | Kim et al. | | |
| 2019/0189060 A1 | 6/2019 | Takasugi | | |
| 2021/0036087 A1 | 2/2021 | Kwak et al. | | |

FOREIGN PATENT DOCUMENTS

| | | |
|---|---|---|
| KR | 1020150078356 A | 7/2015 |
| KR | 1020170122425 A | 11/2017 |
| KR | 1020180045937 A | 5/2018 |
| KR | 1020180125761 A | 11/2018 |
| KR | 1020180127896 A | 11/2018 |

* cited by examiner

*Primary Examiner* — Stephen T. Reed
(74) *Attorney, Agent, or Firm* — CANTOR COLBURN LLP

(57) ABSTRACT

A display device includes a display unit, a scan driver, and a data driver. The display unit includes pixels coupled to scan lines, sensing scan lines, data lines, and sensing lines. The scan driver supplies a scan signal to the scan lines, and supplies a sensing scan signal to the sensing scan lines. The data driver supplies an image data voltage to the data lines, and detects sensing values of the pixels on a pixel column basis through the sensing lines during a sensing period. The data driver includes an analog-to-digital converter which converts the detected sensing values into digital data during the sensing period and outputs sensing data. The analog-to-digital converter pauses the detection of the sensing values during a first period of the sensing period.

13 Claims, 10 Drawing Sheets

<SP>

DISPLAY DEVICE

The present application is a divisional of U.S. patent application Ser. No. 17/092,966, filed on Nov. 9, 2020, which claims priority to Korean patent application number No. 10-2020-0031999, filed on Mar. 16, 2020, and all the benefits accruing therefrom under 35 U.S.C. § 119, the content of which in its entirety is herein incorporated by reference.

BACKGROUND

Field of Invention

Various embodiments of the present disclosure relate to a display device.

Description of Related Art

A display device may perform an operation of sensing a threshold voltage, mobility, etc. of a driving transistor included in a pixel circuit, and thereby compensating for degradation or a change in characteristics of the driving transistor outside the pixel circuit.

With an increase in display resolution and driving frequency, inconvenience when viewing images may be caused; for example, motion blur may be visible when moving images are displayed. To mitigate such a motion blur phenomenon, a technique of inserting a black image between frames has been proposed.

SUMMARY

Various embodiments of the present disclosure are directed to a display device which may control output of a clock for extracting a sensing value such that, during a sensing period, a period in which sensing values are extracted does not overlap with a period in which a black image is inserted.

An embodiment of the present disclosure provides a display device including a display unit including pixels coupled to scan lines, sensing scan lines, data lines, and sensing lines; a scan driver which supplies a scan signal to the scan lines, and supplies a sensing scan signal to the sensing scan lines; and a data driver which supplies an image data voltage to the data lines, and detects sensing values of the pixels on a pixel column basis through the sensing lines during a sensing period. The data driver includes an analog-to-digital converter which converts the detected sensing values into digital data during the sensing period and outputs sensing data. The analog-to-digital converter pauses the detection of the sensing values during a first period of the sensing period.

In an embodiment, the data driver may further include a clock generator which sequentially outputs a plurality of sensing clocks. The analog-to-digital converter may output the sensing data based on the sensing clocks. The clock generator may pause the output of the sensing clocks during the first period.

In an embodiment, the display device may further include a timing controller which transmits image data in which a clock is embedded to the data driver. The data driver may further include a clock recovery circuit which extracts the clock from the image data. The clock generator may generate the sensing clocks by dividing the clock extracted from the image data.

In an embodiment, the scan driver may simultaneously supply the scan signal to scan lines corresponding to k pixel rows (here, k is a natural number greater than 1) among the scan lines in a second period of the sensing period. The data driver may supply a low gray scale data voltage to the data lines in the second period.

In an embodiment, the first period may overlap with the second period.

In an embodiment, the low gray scale data voltage may be an image data voltage corresponding to a black gray scale.

In an embodiment, the scan lines corresponding to the k pixel rows may be successively arranged.

In an embodiment, the data driver may further include an output circuit electrically coupled to the sensing lines and which provides the sensing values to the analog-to-digital converter on the pixel column basis.

In an embodiment, the output circuit may include a plurality of sub-output circuits electrically coupled to the sensing lines, respectively. The sub-output circuits may sequentially provide the sensing values to the analog-to-digital converter in response to the sensing clocks, respectively.

In an embodiment, the display device may further include a timing controller which provides a sensing pause signal to the data driver. The clock generator may pause the output of the sensing clocks based on the sensing pause signal.

In an embodiment, the sensing pause signal may include a first sub-sensing pause signal and a second sub-sensing pause signal. In the second period, the timing controller may generate the first sub-sensing pause signal based on a rising edge of the scan signal, and generate the second sub-sensing pause signal based on a falling edge of the scan signal.

In an embodiment, the clock generator may pause the output of the sensing clocks in synchronization with a rising edge of the first sub-sensing pause signal, and re-output the sensing clocks in synchronization with a falling edge of the second sub-sensing pause signal.

In an embodiment, the clock generator may pause the output of the sensing clocks in synchronization with a rising edge of the first sub-sensing pause signal, and re-output the sensing clocks in synchronization with a rising edge of the second sub-sensing pause signal.

In an embodiment, the output circuit may provide a sensing value corresponding to a j-th sensing line (here, j is a natural number greater than 1) to the analog-to-digital converter immediately before the first period starts. The output circuit may supply a sensing value corresponding to a j+1-th sensing line to the analog-to-digital converter immediately after the first period.

In an embodiment, during the first period, the output circuit may not supply the sensing values to the analog-to-digital converter.

In an embodiment, during the first period, the analog-to-digital converter may pause the output of the sensing data.

Another embodiment of the present disclosure provides a display device including a display unit including pixels coupled to scan lines, sensing scan lines, data lines, and sensing lines; a scan driver which supplies a scan signal to the scan lines, and supplies a sensing scan signal to the sensing scan lines; a data driver which supplies an image data voltage to the data lines; and a sensing circuit which detects sensing values of the pixels on a pixel column basis through the sensing lines during a sensing period. The sensing circuit includes an analog-to-digital converter which converts the detected sensing values into digital data during the sensing period and output sensing data. The analog-to-digital converter pauses the detection of the sensing values during a first period of the sensing period.

In an embodiment, the display device may further include a timing controller which transmits image data in which a clock is embedded to the data driver. The sensing circuit may include a clock recovery circuit which extracts the clock from the image data; a clock generator which sequentially outputs a plurality of sensing clocks by dividing the clock extracted from the image data; and an output circuit electrically coupled to the sensing lines and which provides the sensing values to the analog-to digital converter on the pixel column basis.

A display device in accordance with embodiments of the present disclosure may control output of a clock for extracting a sensing value such that, during a sensing period, a period in which sensing values are extracted does not overlap with a period in which a black image is inserted. Consequently, signal noise in the data driver may be reduced (or minimized), such that a change in characteristics may be accurately detected.

Effects of the present disclosure are not limited to the above-described effects, and various modifications are possible without departing from the spirit and scope of the present disclosure.

DETAILED DESCRIPTION

Figure 1:
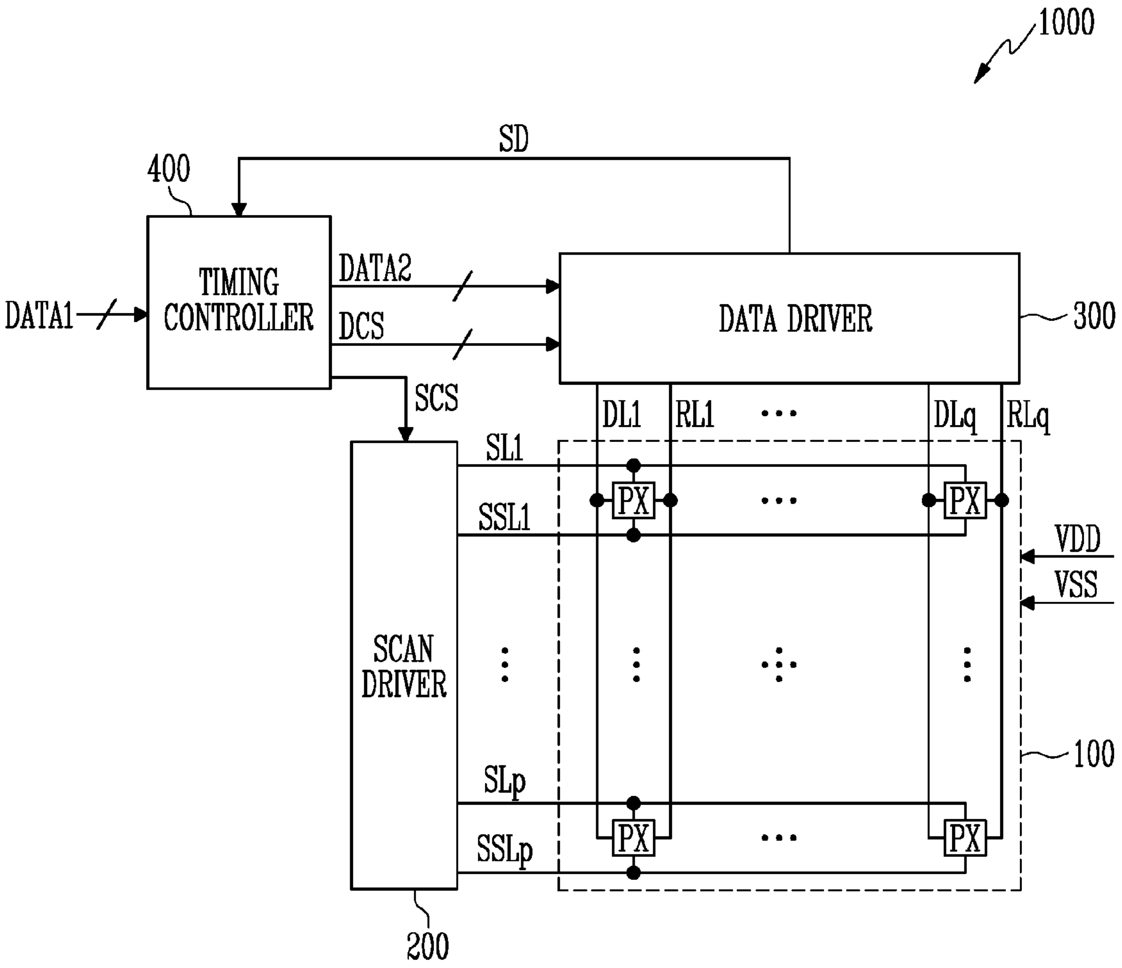
FIG. 1 is a block diagram illustrating an example of a display device in accordance with embodiments of the present disclosure.

As the present disclosure allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure.

Throughout the disclosure, like reference numerals refer to like parts throughout the various figures and embodiments of the present disclosure. The sizes of elements in the accompanying drawings may be exaggerated for clarity of illustration. It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element. In the present disclosure, the singular forms are intended to include the plural forms as well, unless the context clearly indicates otherwise.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

It will be understood that when an element is referred to as being "coupled" to another element, it may be directly coupled to the element or coupled thereto with other elements interposed therebetween.

Embodiments of the present disclosure will hereinafter be described in detail with reference to the accompanying drawings.

FIG. 1 is a block diagram illustrating a display device 1000 in accordance with embodiments of the present disclosure.

Referring to FIG. 1, the display device 1000 may include a display unit 100 (or a display panel), a scan driver 200 (i.e., a gate driver, or a gate driver IC), a data driver 300 (i.e., a source driver, or a source driver IC), and a timing controller 400.

In an embodiment, a period in which the display device 1000 is driven may be divided into a display period (e.g., a display period DP of FIG. 6) for displaying an image, and a sensing period (e.g., a sensing period SP of FIG. 6) for sensing characteristics of a driving transistor and/or a light emitting element included in each of the pixels PX.

The display unit 100 may include scan lines SL1 to SLp (here, p is a positive integer), sensing scan lines SSL1 to SSLp, data lines DL1 to DLq (here, q is a positive integer), sensing lines RL1 to RLq (or receiving lines), and pixels PX. The display unit 100 may include a plurality of pixel rows and a plurality of pixel columns. For example, n-th pixel rows may correspond to the pixels PX connected to the scan line SLn and the sensing scan lines SSLn (here, n is a positive integer of p or less), and m-th pixel columns may correspond to the pixels PX connected to the data lines DLm and the sensing lines RLm (here, m is a positive integer of p or less).

Each of the pixels PX may be coupled to at least one of the scan lines SL1 to SLp, at least one of the sensing scan lines SSL1 to SSLp, one of the data lines DL1 to DLq, and one of the sensing lines RL1 to RLp. Detailed configuration and operation of the pixel PX will be described later herein with reference to FIG. 2.

The pixels PX may be supplied with voltages of a first power supply VDD and a second power supply VSS from an external device.

Although FIG. 1 illustrates the p scan lines SL1 to SLp and the p sensing scan lines SSL1 to SSLp, the present disclosure according to the invention is not limited thereto. For example, one or more control lines, one or more scan lines, one or more sensing scan lines, etc. may be additionally provided in the display unit 100 depending on a circuit structure of the pixel PX.

In an embodiment, the transistors included in the pixel PX may be N-type oxide thin-film transistors. For example, an oxide thin-film transistor may be a low-temperature polycrystalline oxide ("LTPO") thin-film transistor. However, this is only for illustrative purposes, and the N-type transistors according to the invention are not limited thereto. For example, an active pattern (or a semiconductor layer) included in each transistor may include an inorganic semiconductor (e.g., amorphous silicon, poly silicon) or an organic semiconductor in another embodiment. Furthermore, at least one of the transistors included in the display device 1000 may be replaced with a P-type transistor.

In an embodiment, the pixels PX of the display unit 100 may be divided into a plurality of pixel blocks. Each of the pixel blocks may include preset successive pixel rows. For example, each of the pixel blocks may include k pixel rows (here, k is a positive integer of 2 or more and less than p).

A black image insert operation may be performed on the basis of pixel blocks. In an embodiment, black data voltages may be simultaneously supplied to pixel rows included in each of the pixel blocks such that a black image may be displayed on a corresponding pixel block during a predetermined period. The black image insert operation will be described later herein with reference to FIGS. 3 to 4B.

The timing controller 400 may generate a data control signal DCS and a scan control signal SCS based on a control signal (e.g., a control signal including a clock signal) supplied from an external device. The timing controller 400 may supply the data control signal DCS to the data driver 300, and supply the scan control signal SCS to the scan driver 200.

The data control signal DCS may include a source start signal and clock signals. The source start signal may control a data sampling start time. The clock signals may be used to control a sampling operation.

The data control signal DCS may further include a sensing start signal, a sensing pause signal, and clock signals. The sensing start signal may define or control a start of a sensing operation of the data driver 300. The sensing pause signal may control a sensing value extraction operation of the data driver 300. The clock signals included in the data control signal DCS may be used to sequentially extract sensing values.

The scan control signal SCS may further include a scan start signal, a sensing scan start signal, and clock signals. The scan start signal may control a timing of a scan signal. The sensing scan start signal may control a timing of a sensing scan signal. The clock signals included in the scan control signal SCS may be used to shift the scan start signal and/or the sensing scan start signal.

The timing controller 400 may rearrange input image data DATA1 supplied from an external device (e.g., a graphic processor), generate image data DATA2, and supply the generated image data DATA2 to the data driver 300.

In an embodiment, the timing controller 400 may transmit the image data DATA2 in which a clock is embedded, to the data driver 300 in the form of a packet using a serial interface (or a high-speed serial interface). To this end, the data driver 300 and the timing controller 400 may be connected to each other through a universal serial interface ("USI"), a universal serial interface for TV ("USI-T"), or a universal description, discovery and integration ("UDDI"), and thus communicate with each other. The timing controller 400 may transmit the image data DATA2 and the data control signal DCS to the data driver 300 in the form of a data package through the serial interface.

In an embodiment, the timing controller 400 may further control a sensing operation of the data driver 300. For example, the timing controller 400 may control a timing at which a reference voltage (e.g., a reference voltage VINIT of FIG. 5) is supplied to the pixels PX through the sensing lines RL1 to RLq, and/or a timing at which a current generated from the pixels PX is sensed through the sensing lines RL1 to RLq.

In an embodiment, the timing controller 400 may detect a change in characteristics of the driving transistor based on current or voltage extracted from the pixel PX. The timing controller 400 may calculate a compensation value to be used to compensate for the input image data DATA1 based on the detected change in characteristics. The timing controller 400 may compensate for the image data DATA2 based on the compensation value. Here, the sensing period may be a vertical blank period (or a vertical porch period) between the display period and an adjacent display period (e.g., another frame period).

In an embodiment, the timing controller 400 may select one pixel row of the plurality of pixel rows during the sensing period, and control the data driver 300 to perform a sensing operation on the selected pixel row. However, the present disclosure according to the invention is not limited to the foregoing. For example, the timing controller 400 may select two or more pixels during the sensing period in another embodiment.

The scan driver 200 may receive the scan control signal SCS from the timing controller 400. The scan driver 200 may supply scan signals to the scan lines SL1 to SLp, and supply sensing scan signals to the sensing scan lines SSL1 to SSLp.

In an embodiment, for example, the scan driver 200 may sequentially supply the scan signals to the scan lines SL1 to SLp. If the scan signals are sequentially supplied to the scan lines SL1 to SLp, the pixels PX may be selected on a horizontal line basis (i.e., the pixel row basis). To this end, the scan signals may be set to a gate-on voltage (e.g., a logic high level) such that transistors included in the pixels PX may be turned on.

Likewise, the scan driver 200 may supply sensing scan signals to the sensing scan lines SSL1 to SSLp. The sensing scan signals may be used to sense (or extract) a driving current flowing to the pixel (i.e., the current flowing through the driving transistor). The waveforms of the scan signal and the sensing scan signal and the timings at which the scan signal and the sensing scan signal are supplied may be changed depending on the display period and the sensing period.

Although FIG. 1 illustrates that one scan driver 200 outputs both the scan signal and the sensing scan signal, the present disclosure according to the invention is not limited thereto. In another embodiment, for example, the scan driver 200 may include a first scan driver configured to supply the scan signal to the display unit 100, and a second scan driver configured to supply the sensing scan signal to the display unit 100. In other words, the first and second scan drivers may be embodied as separate components.

The data driver 300 may be supplied with a data control signal DCS from the timing controller 400. The data driver 300 may supply image data voltages to the data lines DL1 to DLq. In an embodiment, the data driver 300 may supply an image data voltage to the display unit 100 in a first scan period (e.g., a first scan period P1 of FIG. 3) of each of the pixels PX during one frame period. Furthermore, the data driver 300 may supply a black data voltage to the display unit 100 in a second scan period (e.g., a second scan period P2 of FIG. 3) during one frame period. Here, the image data voltage may be a data voltage for displaying an image, i.e., a data voltage corresponding to the image data DATA1. The black data voltage may be a data voltage corresponding to a black gray scale (or a predetermined low gray scale).

In an embodiment, the data driver 300 may supply data voltages for sensing pixels PX disposed on a selected at least one pixel row so as to extract a current or a voltage from the pixels PX during the sensing period.

The data driver 300 may detect sensing values (e.g., the sensing current, the sensing voltages) from the sensing lines RL1 to RLq on a pixel column basis. For example, the data driver 300 may detect a change in threshold voltage of the driving transistor included in the pixel PX, a change in mobility, a change in characteristics of the light emitting element, and so on.

In an embodiment, during the sensing period, the data driver 300 may supply a predetermined reference voltage (e.g., the reference voltage VINIT of FIG. 5) to the pixels PX through the sensing lines RL1 to RLq, and receive the current or the voltages extracted from the pixels PX. The extracted current or voltage may correspond to a sensing value. The data driver 300 may detect a change in characteristics of the driving transistor based on the sensing value. The data driver 300 may provide a sensing value (or sensing data SD) for the detected characteristic change to the timing controller 400.

In an embodiment, during the sensing period, the data driver 300 may sequentially extract, using a clock signal (e.g., an ADC clock ADC CLK of FIG. 5), sensing values corresponding to pixels PX disposed on at least one selected pixel row, respectively. Here, to prevent noise between signals, the data driver 300 may control such that, during the sensing period, a period in which the sensing values are extracted does not overlap with a period in which a black image is inserted. The sensing value extraction operation of the data driver 300 will be described later herein with reference to FIGS. 5 to 7.

Figure 2:
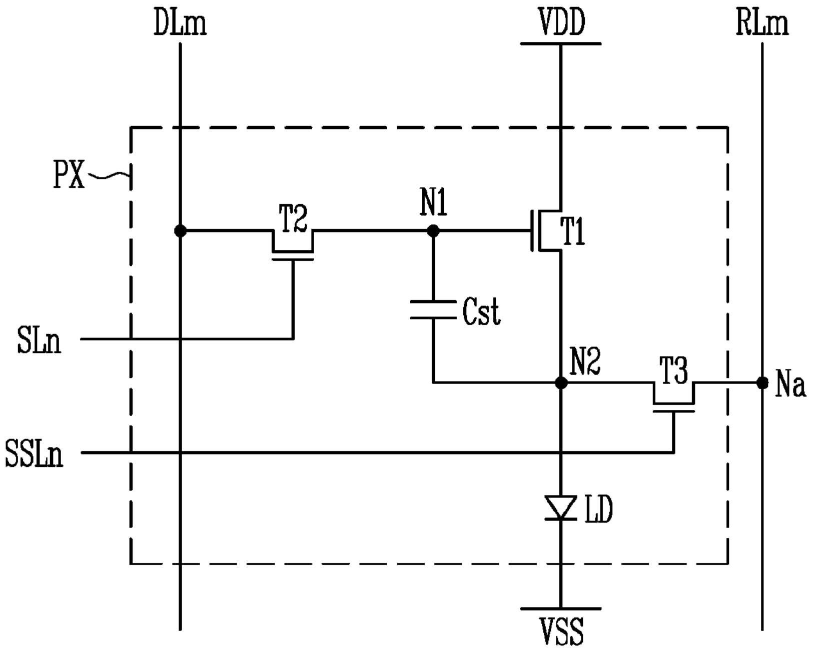
FIG. 2 is a circuit diagram illustrating an example of a pixel included in the display device of FIG. 1.

FIG. 2 is a circuit diagram illustrating an example of a pixel PX included in the display device of FIG. 1.

Referring to FIG. 2, the pixel PX may include transistors T1, T2, and T3 (or switching elements), a storage capacitor Cst, and a light emitting element LD. The transistors T1, T2, and T3 may be N-type transistors.

The first transistor T1 may include a gate electrode coupled to a first node N1, an electrode (or a first electrode) coupled to the first power supply VDD, and another electrode (or a second electrode) coupled to a second node N2. The first transistor T1 may be referred to as “driving transistor”.

The second transistor T2 may include a gate electrode coupled to the scan line SLn (n is a natural number), an electrode (or a first electrode) coupled to the data line DLm (m is a natural number), and another electrode (or a second electrode) coupled to the first node N1. The second transistor T2 may be referred to as “switching transistor”, “scan transistor”, or the like.

The third transistor T3 may include a gate electrode coupled to the sensing scan line SSLn, an electrode (or a first electrode) coupled to the second node N2, and another electrode (or a second electrode) coupled to the sensing line RLm (or a connection node Na). The third transistor T3 may be referred to as “initialization transistor”, “sensing transistor”, or the like. When the third transistor T3 is turned on, a preset voltage (e.g., an initialization voltage) may be supplied to the second node N2, or a sensing value (sensing data) may be transmitted to the data driver 300 through the sensing line RLm.

The storage capacitor Cst may include an electrode (or a first electrode) coupled to the first node N1, and another electrode (or a second electrode) coupled to the second node N2.

The light emitting element LD may include a first electrode (e.g., an anode) coupled to the second node N2, and a second electrode (e.g., a cathode) coupled to the second power supply VSS. The light emitting element LD may be an organic light emitting diode or an inorganic light emitting diode.

The voltage of the first power supply VDD and the voltage of the second power supply VSS may be voltages needed to operate the pixel PX. The first power supply VDD may have a voltage level higher than a voltage level of the second power supply VSS.

Figure 3:
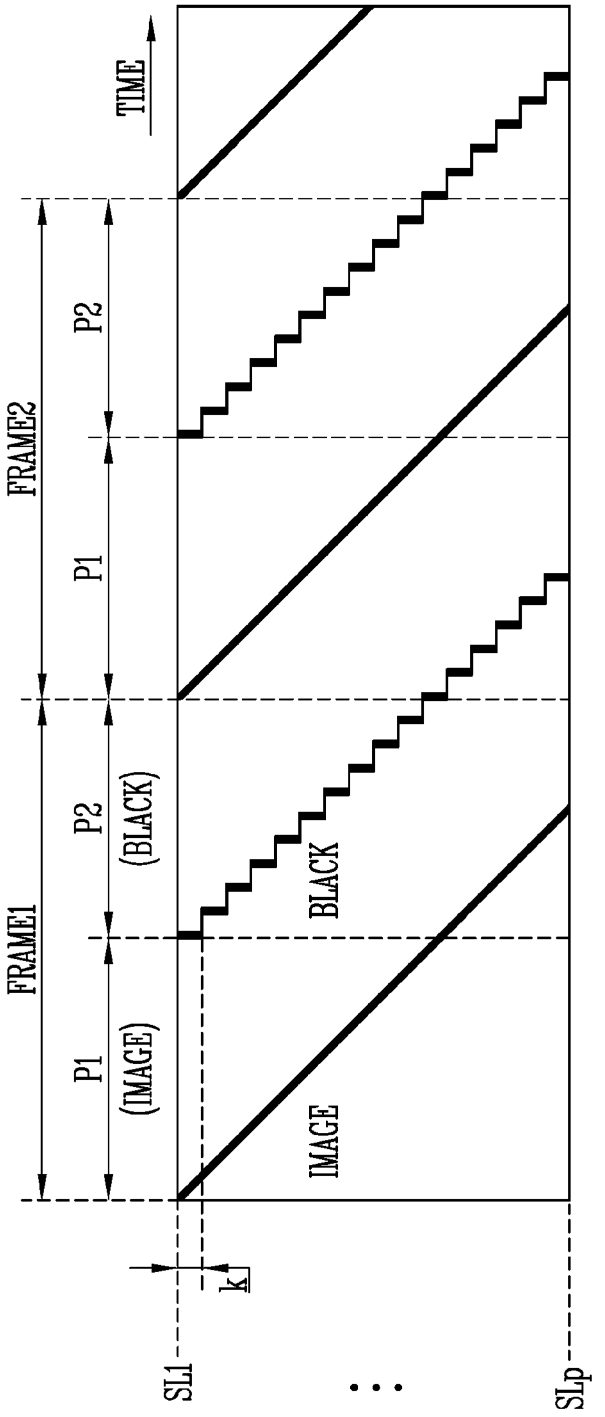
FIG. 3 is a diagram schematically illustrating an example of a method of driving the display device of FIG. 1.

FIG. 3 is a diagram schematically illustrating a method of driving the display device of FIG. 1. FIG. 3 illustrates signals to be provided to the pixels corresponding to the scan lines SL1 to SLp as time passes.

Referring to FIGS. 1 to 3, each of frame periods FRAME1 and FRAME2 for a pixel PX or a pixel row may include a first scan period P1 and a second scan period P2. The first scan period P1 may be a period in which the pixel PX emits light having a luminance corresponding to the image data DATA2. The second scan period P2 may be a period in which the pixel PX emits black light at a low luminance corresponding to a black data voltage or does not emits light. Here, the first scan period P1 and the second scan period P2 may be changed depending on respective pixels PX. For the sake of description, FIG. 3 illustrates the first scan period P1 and the second scan period P2 that correspond to pixels PX disposed on a first pixel row (e.g., pixels PX coupled to the first scan line SL1).

In an embodiment, at a start time point of the first scan period P1, a scan signal (or a first scan pulse) having a turn-on voltage level may be applied to the pixels PX coupled to the first scan line SL1. Here, the turn-on voltage level may be a voltage level at which transistors in the pixel PX are turned on and, for example, be a voltage level at which the second transistor T2 described with reference to FIG. 2 is turned on. In this case, the pixels PX coupled to the first scan line SL1 may emit light at a luminance during the first scan period P1.

As illustrated in FIG. 3, the scan signal (or the first scan pulse) having a turn-on voltage may be sequentially provided to the scan lines SL1 to SLp, such that the pixels PX corresponding to the scan lines SL1 to SLp may sequentially emit light.

In an embodiment, at a start time point of the second scan period P2, a scan signal (or a second scan pulse) having a turn-on voltage level may be applied to the pixels PX coupled to the first scan line SL1. In this case, the pixels PX coupled to the first scan line SL1 each may store a black data voltage and emit black light at a low luminance corresponding to the black data voltage during the second scan period P2.

As illustrated in FIG. 3, the scan signal (or the second scan pulse) having a turn-on voltage may be provided in common to k scan lines (here, k is a positive integer of 2 or more and less than p) of the scan lines SL1 to SLp at the same time. Therefore, the timing diagram for the second scan pulse (e.g., EIF. 3) may have an overall step shape. In this case, a scan time required for providing the same black data voltage to the pixels PX may be reduced.

As described with reference to FIG. 3, the display device 1000 may control the pixel such that the pixel emits light during the first scan period P1 in one frame period, and emits light or not in response to the black image insert operation during the second scan period P2. In other words, the display device 1000 may be driven using a black image insertion technique.

Figure 4A:
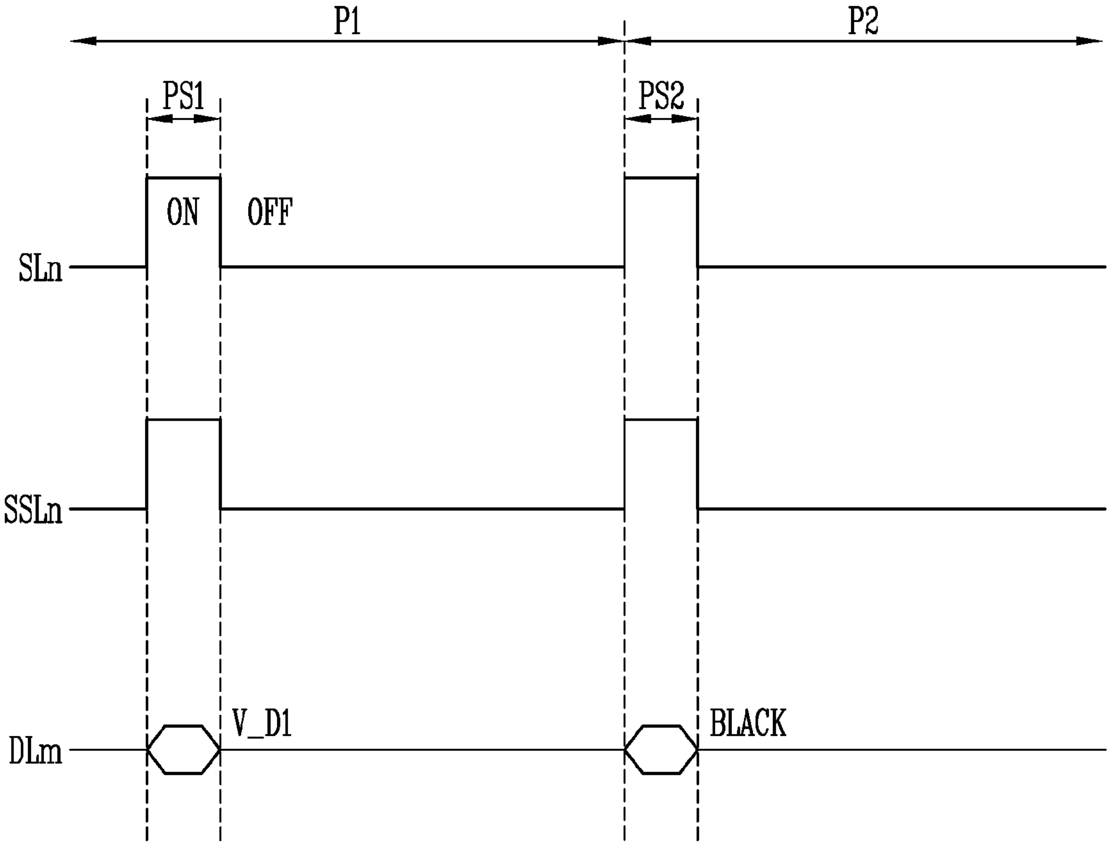
FIGS. 4A and 4B are waveform diagrams illustrating examples of the operation of the pixel of FIG. 2.
Figure 4B:
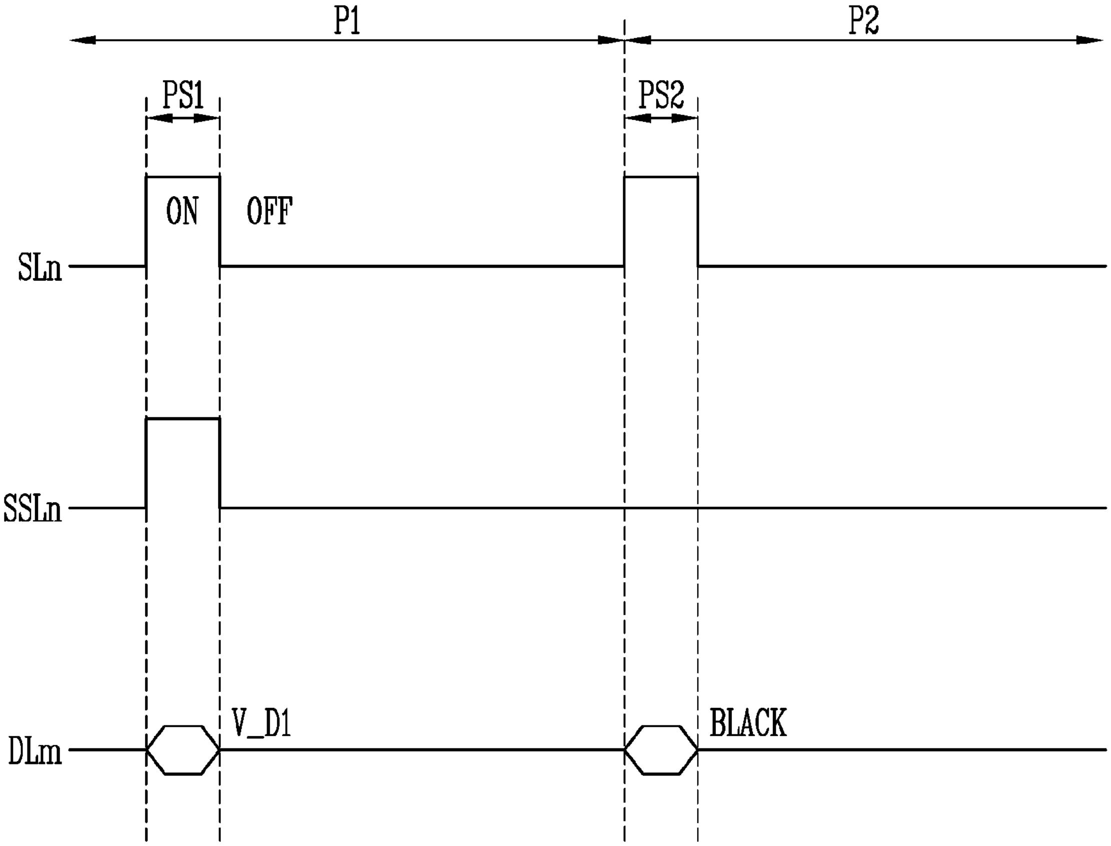

FIGS. 4A and 4B are waveform diagrams illustrating examples of the operation of the pixel of FIG. 2.

Referring to FIGS. 1 to 4A, during a first sub-period PS1 of the first scan period P1, a scan signal (or a first scan pulse) having a turn-on voltage level may be applied to the scan line SLn, and a sensing scan signal (or a first sensing scan pulse) having a turn-on voltage level may be applied to the sensing scan line SSLn. Furthermore, a data voltage corresponding to a specific gray scale value may be applied to the data line DLm. For example, a data voltage V_D1 may be applied to the data line DLm.

In this case, the second transistor T2 may be turned on in response to the scan signal, and the data voltage may be provided to the first electrode of the storage capacitor Cst. Furthermore, the third transistor T3 may be turned on in response to the sensing scan signal, and the reference voltage (e.g., the reference voltage VINIT of FIG. 5) applied to the sensing line RLm may be provided to the second electrode of the storage capacitor Cst. Therefore, a voltage corresponding to a difference between the data voltage (e.g., the data voltage V_D1) and the reference voltage (e.g., the reference voltage VINIT of FIG. 5) may be stored in the storage capacitor Cst. Subsequently, if the second transistor T2 and the third transistor T3 are turned off, the amount of driving current flowing through the first transistor T1 may be determined in response to the voltage stored in the storage capacitor Cst, such that the light emitting element LD may emit light at a luminance corresponding to the amount of driving current during the first scan period P1. Hence, during the first scan period P1, a substantially desired image may be displayed.

Likewise, during a second sub-period PS2 of the second scan period P2, a scan signal (or a second scan pulse) having a turn-on voltage level may be applied to the scan line SLn, and a sensing scan signal (or a second sensing scan pulse) having a turn-on voltage level may be applied to the sensing scan line SSLn. A data voltage to be applied to the data line DLm may have a black data voltage BLACK corresponding to a black color. Therefore, the light emitting element LD may represent the black color or may not emit light as representing the black color during the second scan period P2. In the case where the pixel PX displays moving images, the response time of the pixel may be increased by a rapid change in data voltage. Because of the increase in response time, motion blur may be visible to a user. However, since a black image is inserted during a short black insertion period (i.e., the second scan period P2) between the first scan periods P1 for displaying the moving images, the motion blur phenomenon of the moving images may be mitigated.

The length of the first scan period P1 and the length of the second scan period P2 in one frame (e.g., FRAME1) may be determined to the optimum values depending on factors such as an image change speed, and a frequency.

Although FIG. 4A illustrates that the sensing scan signal has a turn-on voltage level in the second sub-period PS2 of the second scan period P2, the present disclosure according to the invention is not limited thereto.

In another embodiment, for example, as illustrated in FIG. 4B, the sensing scan signal may have a turn-off voltage level in the second sub-period PS2. In this case, a data voltage (i.e., a black data voltage BLACK) may be provided to the first electrode of the storage capacitor Cst in response to a scan signal, and the first transistor T1 may be turned off. The storage capacitor Cst may maintain the black data voltage BLACK during the second scan period P2, such that the first transistor T1 may be maintained in the turn-off state.

Figure 5:
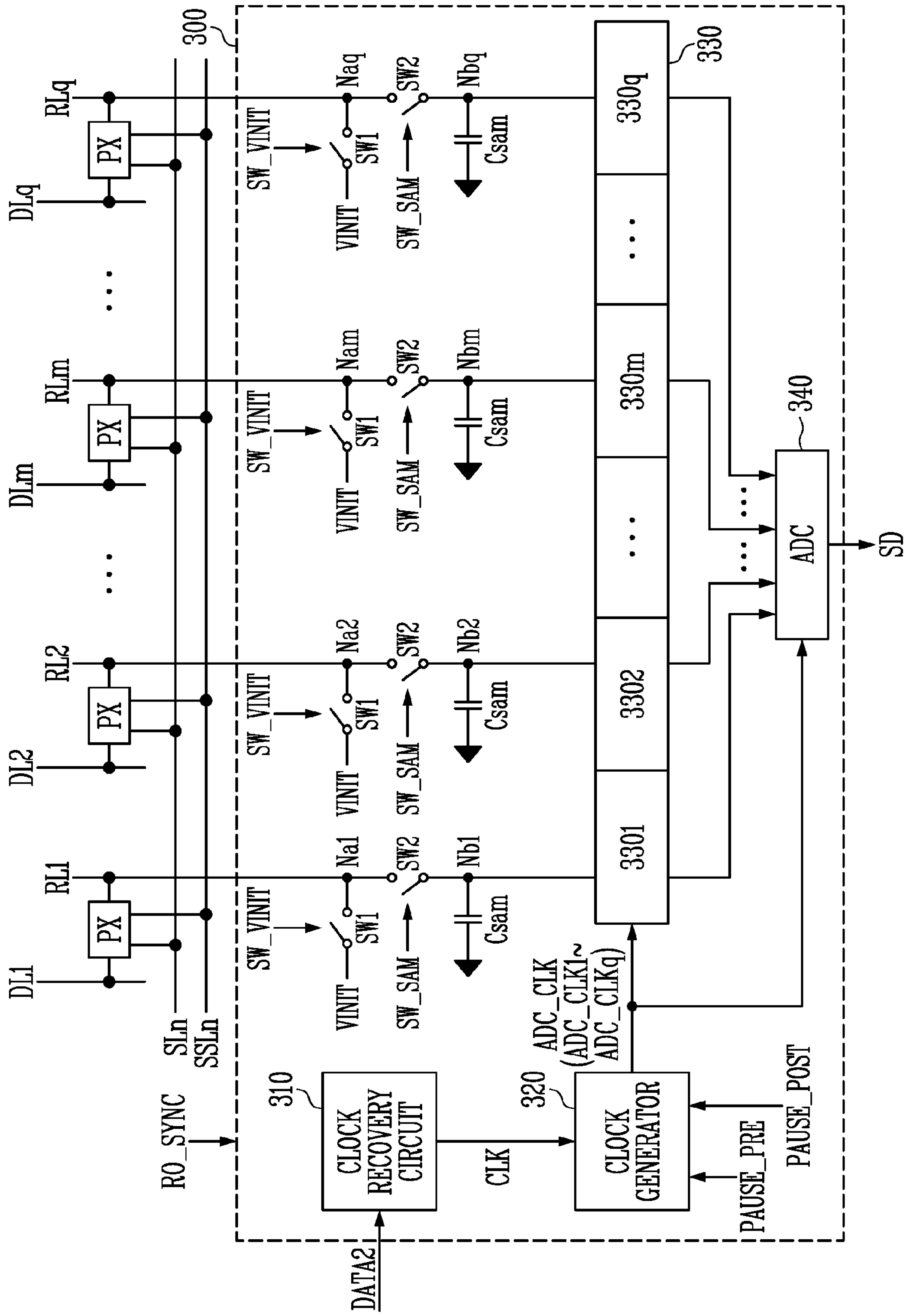
FIG. 5 is a diagram illustrating an example of a data driver included in the display device of FIG. 1.

FIG. 5 is a diagram illustrating an example of the data driver included in the display device of FIG. 1. For the sake of description, FIG. 5 illustrates pixels PX (i.e., pixels PX coupled to an n-th scan line SLn) disposed on an n-th pixel row (here, n is a positive integer of p or less) among the pixels PX of FIG. 1. Unless otherwise defined, the following description will be focused on pixels PX (i.e., pixels PX coupled to an m-th data line DLm) coupled to an m-th pixel column (here, m is a positive integer of q or less).

Referring to FIGS. 1, 2, and 5, the data driver 300 may include a clock recovery circuit 310, a clock generator 320, an output circuit 330, and an analog-to-digital converter 340 (hereinafter, referred to as "ADC"), so as to sense a change in threshold voltage of the first transistor T1 included in each of the pixels PX, a change in mobility, a change in characteristics of the light emitting element LD, and so on. The data driver 300 may further include an initialization switch SW1 and a sampling switch SW2. The pixel PX of FIG. 5 is substantially equal or similar to the pixel PX described with reference to FIG. 2; therefore, repetitive explanation will be skipped.

A sensing start signal RO_SYNC may be applied to the data driver 300. If the sensing start signal RO_SYNC is applied to the data driver 300, the data driver 300 may start a sensing operation.

The initialization switch SW1 may be coupled between the sensing line RLm and the power line to which an initialization voltage VINIT is applied. The initialization switch SW1 may be turned on by an initialization switch control signal SW_VINIT provided from the timing controller 400. The initialization switch SW1 may control the connection between the power line to which the initialization voltage VINIT is applied and a connection node Nam. Hence, the initialization voltage VINIT may be applied to the sensing line RLm (e.g., the connection node Nam). Here, the initialization voltage VINIT may be provided from a separate power supply and have a voltage level lower than an operating point of the light emitting element LD. For example, the initialization voltage VINIT may have a voltage level identical with the voltage level of the second power supply (VSS of FIG. 2). In the case where the initialization switch SW1 is turned on, the initialization voltage VINIT may be applied to the sensing line RLm. In the case where the third transistor T3 of the pixel PX is turned on, the initialization voltage VINIT may be applied to the second node N2 (See FIG. 2) of the pixel PX. The initialization voltage VINIT has a voltage level lower than the operating point of the light emitting element LD. Hence, even when the first transistor T1 is turned on, the light emitting element LD may not emit light.

The sampling switch SW2 may be coupled between the sensing line RLm (or the connection node Nam) and a sampling node Nbm. The sampling switch SW2 may be turned on by a sampling switch control signal SW_SAM provided from the timing controller 400. The sampling switch SW2 may control the connection between the connection node Nam and the sampling node Nbm.

A sampling capacitor Csam may be coupled between the sampling node Nbm and a predetermined reference power supply. Although the reference power supply may have a ground voltage, the present disclosure according to the invention is not limited thereto. The sampling capacitor Csam may be charged by the current provided through the second node N2, when the initialization switch SW1 is turned off, the sampling switch SW2 is turned, and the third transistor t3 of the pixel PX is turned on. In other words, the sampling capacitor Csam may store a characteristic value of the pixel PX that is provided through the second node N2.

The clock recovery circuit 310 may generate an internal clock CLK by extracting a clock from the image data DATA2 in which a packet-type clock provided from the timing controller 400 is embedded and recovering the extracted clock. The clock recovery circuit 310 may provide the internal clock CLK to the clock generator 320. Here, the recovered internal clock CLK may be a signal for converting serialized image data DATA2 provided from the timing controller 400 into a parallel data through the serial interface. For example, the data driver 300 may extract the serialized image data DATA2 in response to a timing of the internal clock CLK recovered by the clock recovery circuit 310, and convert the image data DATA2 into the parallel data.

The clock generator 320 may output an ADC clock ADC_CLK (or a sensing clock) based on the internal clock CLK and a sensing pause signal (a first sensing pause signal PAUSE_PRE and a second sensing pause signal PAUSE_POST).

The clock generator 320 may generate an ADC clock ADC_CLK by dividing the internal clock CLK provided from the clock recovery circuit 310 and output the generated ADC clock ADC_CLK. For example, the clock generator 320 may be formed of or include a frequency divider circuit or the like. The clock generator 320 may generate a low-frequency clock (i.e., an ADC clock ADC_CLK) having a frequency lower than that of the recovered internal clock CLK by dividing the internal clock CLK.

Here, the ADC clock ADC_CLK may include a plurality of sub-ADC clocks ADC_CLK1 to ADC_CLKq (or a plurality of sub-sensing clocks). For example, the number of sub-ADC clocks ADC_CLK1 to ADC_CLKq may be the same as the number of sensing lines RL1 to RLq. In other words, the clock generator 320 may sequentially output the plurality of sub-ADC clocks ADC_CLK1 to ADC_CLKq. Therefore, as will be described, the output circuit 330 may extract sensing values of the pixels PX for each pixel column. In other words, the output circuit 330 may extract sensing values for each of the pixels PX coupled to the sensing lines RL1 to RLq.

In an embodiment, the clock generator 320 may control (or pause) the output of the ADC clock ADC_CLK based on a first sensing pause signal PAUSE_PRE and a second sensing pause signal PAUSE_POST such that a period in which sensing values are extracted and a period in which a black image is inserted do not overlap with each other during the sensing period. For example, when the first sensing pause signal PAUSE_PRE having a logic high level is applied, the clock generator 320 may pause the output of the ADC clock ADC_CLK in synchronization with a rising edge of the first sensing pause signal PAUSE_PRE (during a first period). Furthermore, when the second sensing pause signal PAUSE_POST having a logic high level is applied, the clock generator 320 may output an ADC clock ADC_CLK again in synchronization with a falling edge of the second sensing pause signal PAUSE_POST. However, this is only for illustrative purposes, and the present disclosure according to the invention is not limited thereto. In another embodiment, for example, when the second sensing pause signal PAUSE_POST having a logic high level is applied, the clock generator 320 may output an ADC clock ADC_CLK again in synchronization with a rising edge of the second sensing pause signal PAUSE_POST. In another example, the clock generator 320 may receive one sensing pause signal (i.e., one of the first sensing pause signal PAUSE_PRE and the second sensing pause signal PAUSE_POST), and when a sensing pause signal having a logic high level is applied, the clock generator 320 may pause the output of the ADC clock ADC_CLK in synchronization with a rising edge of the sensing pause signal, and output an ADC clock ADC_CLK again in synchronization with a falling edge of the sensing pause signal.

The output circuit 330 may sequentially generate sensing values in response to an ADC clock ADC_CLK provided from the clock generator 320. For instance, the output circuit 330 may be formed of or include a shift register. The output circuit 330 may include q shift registers 3301 to **330*q* (or q sub-output circuits) coupled to the sensing lines RL1 to RLq, respectively. The shift registers 3301 to 330*q* may sequentially generate (or output) sensing values of pixels PX from a first pixel column (or from a pixel PX coupled to the first sensing line RL1) to a last pixel column (or to a pixel PX coupled to a q-th sensing line RLq) in response to q sub-ADC clocks ADC_CLK1 to ADC_CLKq, respectively. During a period (or the first period) in which the clock generator 320 pauses the output of the ADC clock ADC_CLK, the output circuit 330 may pause the output of the sensing values. For example, the output circuit 330** may generate a sensing value corresponding to a j-th sensing line (here, j is a natural number greater than 1) immediately before the first period starts, and generate a sensing value corresponding to a j+1-th sensing line immediately after the first period ends.

The ADC 340 may be coupled to shift registers 3301 to **330*q* included in the output circuit 330. The ADC 340 may receive analog sensing values from the output circuit 330 based on output timings of a plurality of sub-ADC clocks ADC_CLK1 to ADC_CLKq and convert the analog sensing values provided from the output circuit 330 into digital sensing values, thus generating sensing data SD. The ADC 340 may transmit the sensing data SD to the timing controller 400**.

Hereinafter, the sensing operation of the data driver 300 in the sensing period will be described in detail with reference also to FIGS. 6 and 7.

Figure 6:
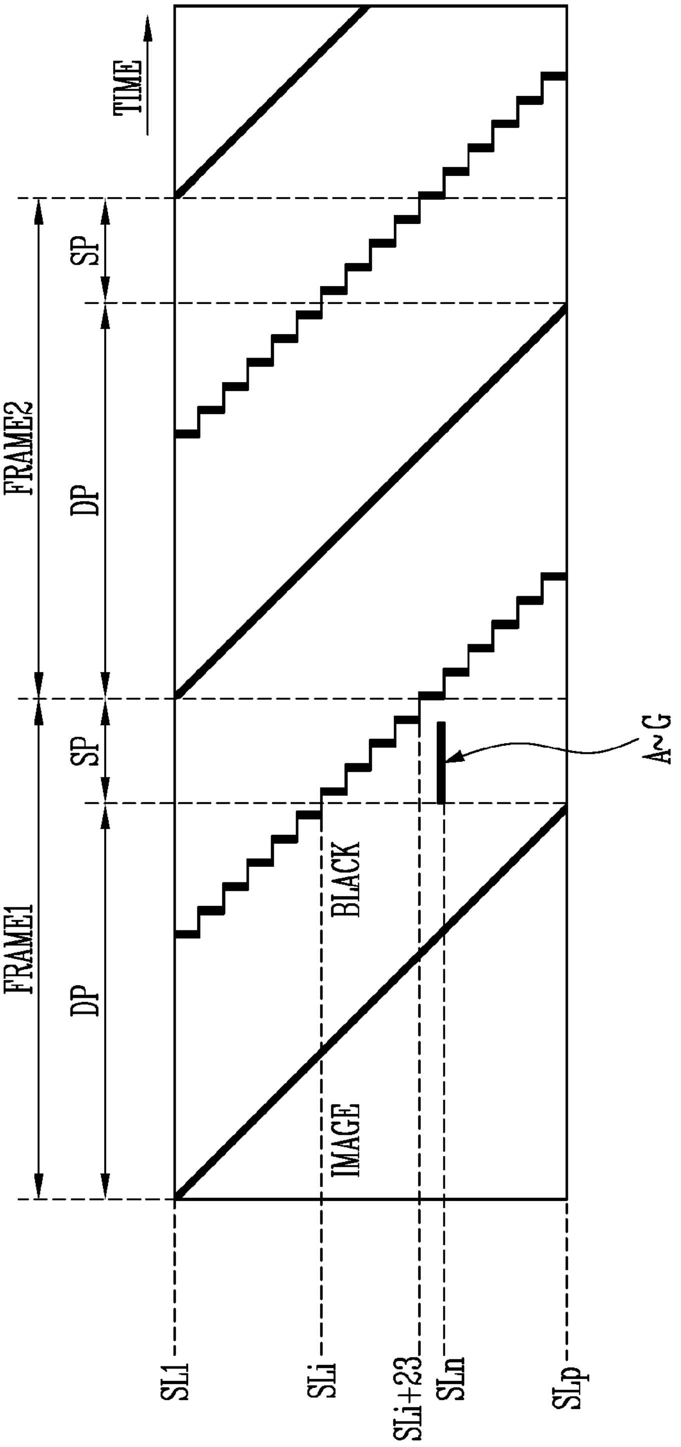
FIG. 6 is a diagram for describing an example of the operation of the data driver of FIG. 5.

FIG. 6 is a diagram schematically illustrating a method of driving the data driver 300 of FIG. 5.

Referring to FIGS. 1 and 6, each of the frame periods FRAME1 and FRAME2 may include a display period DP and a sensing period SP.

During the display period DP, the scan driver 200 may sequentially provide scan signals each having a turn-on voltage to the scan lines SL1 to SLp. The data driver 300 may provide data voltages for displaying an image to the pixels PX through the data lines DL1 to DLq in synchronization with the sequentially provided scan signals.

The sensing period SP may be a period for sensing characteristics of the driving transistor and/or the light emitting element included in each of the pixels PX. In an embodiment, as described with reference to FIG. 1, the timing controller 400 may select one pixel row of the plurality of pixels during the sensing period SP, and the data driver 300 may perform a sensing operation on the selected pixel row (during a period ranging from period A to period G). For example, the data driver 300 may perform a sensing operation on an n-th pixel row (e.g., pixels PX coupled to an n-th scan line SLn).

In the case where during the sensing period SP the data driver 300 sequentially extracts sensing values on a pixel column basis for a selected pixel row and simultaneously provides a black data voltage to another pixel column (or a pixel block including other pixels columns), signal noise may occur in the data driver 300, whereby a characteristic change may not be accurately detected. Therefore, the data driver 300 may be desirable to be controlled such that, during the sensing period SP, a period in which the sensing values are extracted does not overlap with a period in which a black image is inserted. This will be described with reference also to FIG. 7.

Figure 7:
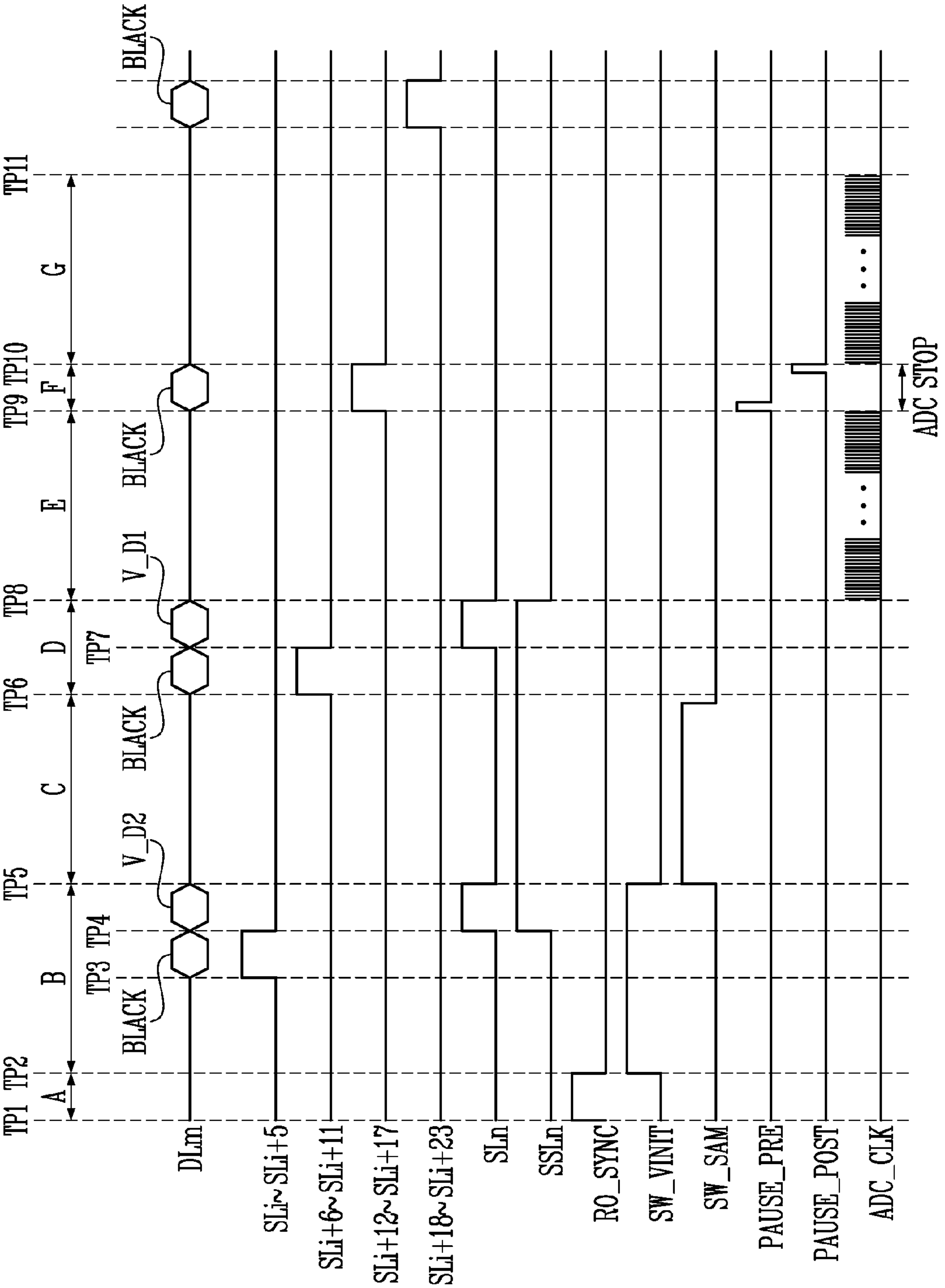
FIG. 7 is a waveform diagram illustrating an example of the operation of the data driver of FIG. 5 during a sensing period of FIG. 6.

FIG. 7 is a waveform diagram illustrating an example of the operation of the data driver of FIG. 5 during the sensing period. In descriptions of FIG. 7, it is assumed that the n-th pixel row {e.g., the pixels (PX of FIG. 5) coupled to the n-th scan line (SLn of FIG. 5)} is selected for a sensing operation. The descriptions will be focused on signals to be applied to the m-th pixel column {e.g., the pixels (PX of FIG. 5) coupled to an m-th data line (DLm of FIG. 5)}. Furthermore, in the descriptions, it is assumed that with regard to a black image insertion operation the plurality of pixel blocks includes six successive pixel rows. That is, six successive pixel rows are operated at the same time.

Referring to FIGS. 1, 2, and 5 to 7, at the first time point TP1 (or in period A), a sensing start signal RO_SYNC having a turn-on level (or a logic high level) may be applied. Based on the sensing start signal RO_SYNC having the turn-on level, the data driver 300 may start the sensing operation.

After the sensing start signal RO_SYNC having the turn-on level has been applied, an initialization switch control signal SW_VINIT having a turn-on level may be applied at a second time point TP2. Hence, the initialization switch SW1 is turned on, such that during an initialization period (e.g., period B) the initialization voltage VINIT may be applied to the connection nodes Na (or the second electrodes of the third transistors T3) of the pixels PX coupled to the n-th scan line SLn.

Thereafter, a black image insertion operation may be performed on a pixel block including i-th to i+5-th scan lines SLi to SLi+5. To this end, at a third time point TP3, a scan signal having a turn-on voltage level may be applied to the i-th to i+5-th scan lines SLi to SLi+5. Furthermore, a black data voltage BLACK may be supplied to the data line DLm. Therefore, the second transistor T2 of each of the pixel PX coupled to the i-th to i+5-th scan lines SLi to SLi+5 may be turned on such that the black data voltage BLACK may be supplied to the first node N1, whereby each of the pixels PX may represent a black color or may not emit light.

At a fourth time point TP4, a scan signal having a turn-on voltage level may be applied to the n-th scan line SLn. Furthermore, a sensing data voltage V D2 may be supplied to the data line DLm. Hence, the second transistor T2 is turned on, such that a sensing data voltage V D2 may be supplied to the first node N1. Here, the sensing data voltage V D2 may have a preset voltage level such that during a sensing operation constant current may be generated on a target pixel column to be sensed.

At the fourth time point TP4, a sensing scan signal having a turn-on voltage level may be applied to the n-th sensing scan line SSLn. Therefore, the third transistor T3 of the pixel PX is turned on, such that the initialization voltage VINIT may be applied to the second node N2 (i.e., the first electrode of the third transistor T3).

At a fifth time point TP5, the scan signal to be applied to the n-th scan line SLn may make a transition to a turn-off voltage level, and the sensing scan signal to be applied to the n-th sensing scan line SSLn may be maintained at the turn-on voltage level. Hence, the second transistor T2 may be turned off, and the third transistor T3 may be turned on or maintained in the turn-on state.

At the fifth time point TP5, the initialization switch control signal SW_VINIT may make a transition to a turn-off level, and a sampling switch control signal SW_SAM having a turn-on level may be applied. Consequently, the initialization switch SW1 may be turned off, and the connection nodes Na1 to Naq of the pixels PX coupled to the n-th scan line SLn may be coupled to the sampling nodes Nb1 to Nbq, respectively. Thereafter, during a sampling period (or period C) in which the sampling switch control signal SW_SAM is maintained in the turn-on state, the sampling capacitor Csam (or the sampling node) may be charged by the current or the voltage (or sensing current or sensing voltage) provided through the second node N2. In other words, the sampling capacitor Csam may store a characteristic value of the pixel PX that is provided through the second node N2. Subsequently, if the sampling switch control signal SW_SAM makes a transition to a turn-off level, the sampling capacitor Csam may hold the stored characteristics (or charged sensing current, sensing voltage) of the pixel PX (during a holding period, or period D)

During a period ranging from a sixth time point TP6 to a seventh time point TP7, a black image insertion operation may be performed on a pixel block including i+6-th to i+11-th scan lines SLi+6 to SLi+11.

At a seventh time point TP7, a scan signal having a turn-on voltage level may be applied to the n-th scan line SLn. Furthermore, a data voltage V_D1 may be supplied to the data line DLm. Hence, the second transistor T2 is turned on, such that a data voltage V_D1 may be supplied to the first node N1. Therefore, after the seventh time point TP7, the pixels PX corresponding to the target pixel column (i.e., the n-th pixel column) to be sensed may display a substantially desired image again.

From an eighth time point TP8, the clock generator 320 may start the output of the ADC clock ADC_CLK. Therefore, the output circuit 330 may sequentially generate sensing values in response to the ADC clock ADC_CLK provided from the clock generator 320, and provide the generated sensing values to the ADC 340 (during a first detection period, or period E).

Thereafter, a black image insertion operation may be performed on a pixel block including i+12-th to i+17-th scan lines SLi+12 to SLi+17. To this end, at a ninth time point TP9, a scan signal having a turn-on voltage level may be applied to the i+12-th to i+17-th scan lines SLi+12 to SLi+17, and a black data voltage BLACK may be supplied to the data line DLm.

In this case, the data driver 300 may pause the sensing value extraction in response to a first sensing pause signal PAUSE_PRE during a pause period (or the first period, or period F) so as to prevent noise from occurring between signals. For example, the clock generator 320 may pause the output of the ADC clock ADC_CLK in synchronization with a rising edge of the first sensing pause signal PAUSE_PRE at the ninth time point TP9. Therefore, the output circuit 330 and the ADC 340 cannot receive the ADC clock ADC_CLK, such that the sensing value extraction may be paused (as shown by "ADC STOP" in FIG. 7).

Thereafter, at a tenth time point TP10, if the black image insertion operation for the pixel block including the i+12-th to i+17-th scan lines SLi+12 to SLi+17 is completed, the data driver 300 may start the sensing value extraction operation again (during a second detection period, or period G). The clock generator 320 may output an ADC clock ADC_CLK in response to a second sensing pause signal PAUSE_POST. For example, the clock generator 320 may start the output of the ADC clock ADC_CLK again in synchronization with a falling edge of the second sensing pause signal PAUSE_POST at the tenth time point TP10. Therefore, the output circuit 330 may sequentially provide sensing values corresponding to the sensing lines SSL1 to SSLq to the ADC 340 in response to the ADC clock ADC_CLK provided from the clock generator 320.

As described with reference to FIGS. 1, 2, and 5 to 7, during the sensing period SP, the data driver 300 may sequentially extract, using the ADC clock ADC_CLK, sensing values corresponding to a target pixel row. Here, the data driver 300 may be controlled such that, during the sensing period SP, the period in which the sensing values are extracted does not overlap with the period in which a black image is inserted. Consequently, signal noise in the data driver 300 may be reduced (or minimized), such that a change in characteristics may be accurately detected.

Figure 8:
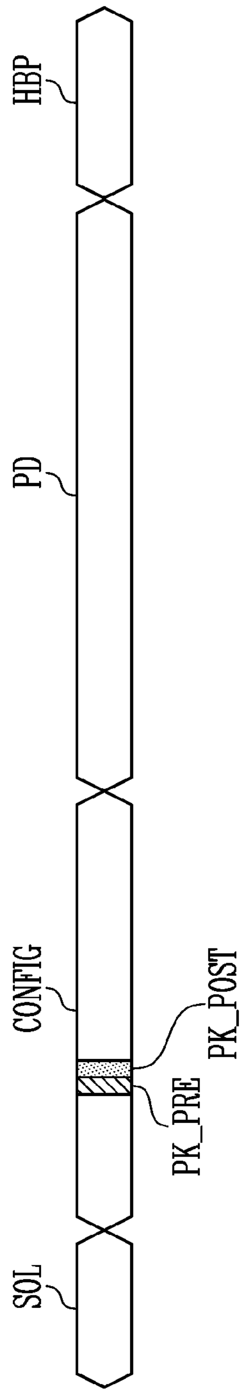
FIG. 8 is a diagram illustrating an example of a data package which is transmitted between a timing controller and a data driver included in the display device of FIG. 1.

FIG. 8 is a diagram illustrating an example of a data package which is transmitted between the timing controller 400 and the data driver 300 included in the display device of FIG. 1.

Referring to FIGS. 1 and 8, a data package that is transmitted between the timing controller 400 and the data driver 300 may include a line start field SOL, a configuration field CONFIG, a pixel data field PD, and a horizontal bank field HBP.

The line start field SOL may indicate a start of each line (or each pixel row) of an image frame to be displayed on the display unit 100. The data driver 300 may operate an internal counter in response to the line start field SOL and thus separate the configuration field CONFIG and the pixel data field PD from each other based on a counting result of the counter. The line start field SOL may include a code having a specific edge or pattern, so as to be separated from a horizontal blank field HBP for a previous line of a current frame image or from a vertical blank period (or the sensing period SP of FIG. 6) between the current frame image and a previous frame image.

The configuration field CONFIG may include pieces of configuration data (or packets) for controlling the data driver 300. The configuration data may include frame configuration data for controlling the frame setting of an image frame or line configuration data for controlling the setting of each line.

In an embodiment, the configuration field CONFIG may include a first packet PK_PRE and a second packet PK_POST. Here, the first packet PK_PRE and the second packet PK_POST may be configuration data for generating the first sensing pause signal PAUSE-PRE and configuration data for generating the second sensing pause signal PAUSE-_POST, respectively. The data driver 300 may generate the first sensing pause signal PAUSE-PRE and the second sensing pause signal PAUSE_POST, based on the first packet PK_PRE and the second packet PK_POST that are included in the data package which is transmitted from the timing controller 400.

The pixel data field PD may include pixel data. Here, the pixel data may include data corresponding to a data voltage for displaying an image on the display unit 100, a black data voltage for displaying a black image, or a sensing data voltage for a sensing operation.

The horizontal blank field HBP may be a period allocated to secure time needed for the data driver 300 to drive the display unit 100 based on the pixel data.

Figure 9:
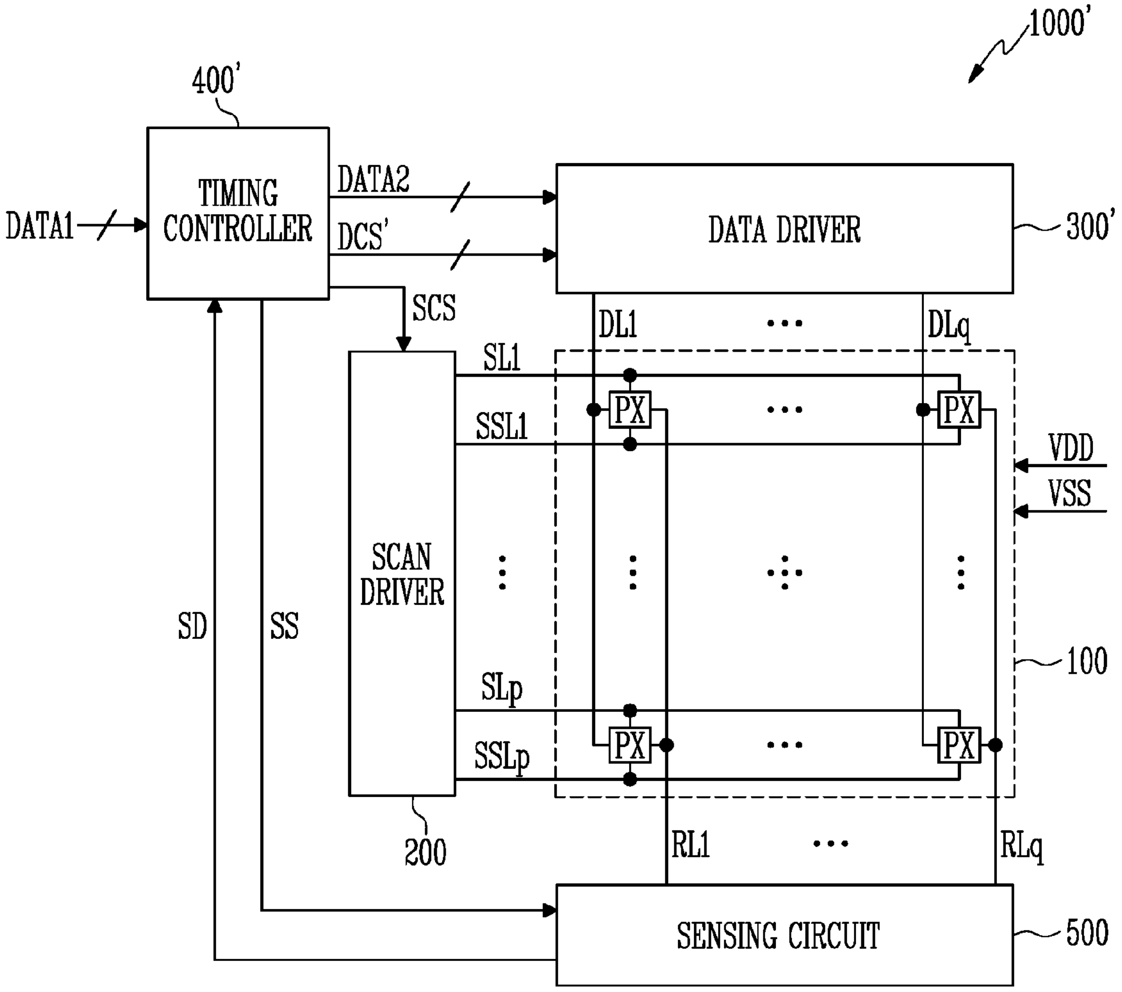
FIG. 9 is a block diagram illustrating another example of the display device in accordance with embodiments of the present disclosure.

FIG. 9 is a block diagram illustrating another example of the display device in accordance with embodiments of the present disclosure.

Referring to FIGS. 1 and 9, a display device 1000' of FIG. 9 may be substantially equal or similar to the display device 1000 of FIG. 1 except for further including a sensing circuit 500; therefore, repetitive explanation will be skipped.

The display device 1000' may include a display unit 100, a scan driver 200, a data driver 300', a timing controller 400', and a sensing circuit 500.

A sensing start signal, a sensing pause signal, and clock signals that are described with reference to FIG. 1 are included in a sensing control signal SS. The timing controller 400' may supply the sensing control signal SS to the sensing circuit 500.

Furthermore, the operation of detecting the sensing values of the data driver 300 that are described with reference to FIGS. 1 to 7 may be implemented by the sensing circuit 500 of FIG. 9. For example, at least some configurations (e.g., the clock recovery circuit 310, the clock generator 320, the output circuit 330, and the ADC 340) and functions of the data driver 300 of FIG. 1 may be implemented by the sensing circuit 500. Therefore, the sensing circuit 500 may detect sensing values from the sensing lines RL1 to RLq, generate sensing data SD, and provide the sensing data SD to the timing controller 400'.

The foregoing detailed description illustrates merely exemplary embodiments of the present disclosure. Exemplary embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Therefore, the description is not intended to limit the invention to the form disclosed herein. Also, it is intended that the appended claims be construed to include alternative embodiments.

What is claimed is:

1. A display device comprising:

a display unit including pixels coupled to scan lines, sensing scan lines, data lines, and sensing lines;

a scan driver which supplies a scan signal to the scan lines, and supplies a sensing scan signal to the sensing scan lines;

a data driver which supplies an image data voltage to the data lines;

a sensing circuit which detects sensing values of the pixels on a pixel column basis through the sensing lines during a sensing period, and a timing controller which transmits image data in which a clock is embedded to the data driver, wherein the sensing circuit comprises:

an analog-to-digital converter which converts the detected sensing values into digital data during the sensing period and outputs sensing data;

a clock recovery circuit which extracts the clock from the image data;

a clock generator which sequentially outputs a plurality of sensing clocks by dividing the clock extracted from the image data; and an output circuit electrically coupled to the sensing lines and providing the sensing values to the analog-to-digital converter on the pixel column basis wherein the analog-to-digital converter pauses the detection of the sensing values during a first period of the sensing period.

2. The display device according to claim 1, wherein the scan driver simultaneously supplies the scan signal to scan lines corresponding to k pixel rows among the scan lines in a second period of the sensing period, k being a natural number greater than 1, and wherein the data driver supplies a low gray scale data voltage to the data lines in the second period.

3. The display device according to claim 2, wherein the first period overlaps with the second period.

4. The display device according to claim 2, wherein the low gray scale data voltage is an image data voltage corresponding to a black gray scale.

5. The display device according to claim 2, wherein the scan lines corresponding to the k pixel rows are successively arranged.

6. The display device according to claim 2, wherein the output circuit comprises a plurality of sub-output circuits electrically coupled to the sensing lines, respectively, and wherein the sub-output circuits sequentially provide the sensing values to the analog-to-digital converter in response to the sensing clocks, respectively.

7. The display device according to claim 6, wherein the timing controller provides a sensing pause signal, and wherein the clock generator pauses the output of the sensing clocks based on the sensing pause signal.

8. The display device according to claim 7, wherein the sensing pause signal comprises a first sub-sensing pause signal and a second sub-sensing pause signal, and wherein, in the second period, the timing controller generates the first sub-sensing pause signal based on a rising edge of the scan signal, and generates the second sub-sensing pause signal based on a falling edge of the scan signal.

9. The display device according to claim 8, wherein the clock generator pauses the output of the sensing clocks in synchronization with a rising edge of the first sub-sensing pause signal, and re-outputs the sensing clocks in synchronization with a falling edge of the second sub-sensing pause signal.

10. The display device according to claim 8, wherein the clock generator pauses the output of the sensing clocks in synchronization with a rising edge of the first sub-sensing pause signal, and re-outputs the sensing clocks in synchronization with a rising edge of the second sub-sensing pause signal.

11. The display device according to claim 1, wherein the output circuit provides a sensing value corresponding to a j-th sensing line to the analog-to-digital converter before the first period starts, j being a natural number greater than 1, and wherein the output circuit supplies a sensing value corresponding to a j+1-th sensing line to the analog-to-digital converter after the first period.

12. The display device according to claim 11, wherein, during the first period, the output circuit does not supply the sensing values to the analog-to-digital converter.

13. The display device according to claim 11, wherein, during the first period, the analog-to-digital converter pauses the output of the sensing data.

* * * * *